US008251080B1

(12) United States Patent
Florkiewicz

(10) Patent No.: US 8,251,080 B1
(45) Date of Patent: Aug. 28, 2012

(54) FLUID TREATMENT CANISTER AND SYSTEM

(75) Inventor: Roger F. Florkiewicz, Schereville, IN (US)

(73) Assignee: Automation and Control Services, Inc., Schereville, IN (US)

( * ) Notice: Subject to any disclaimer, the term of this patent is extended or adjusted under 35 U.S.C. 154(b) by 318 days.

(21) Appl. No.: 12/455,621

(22) Filed: Jun. 4, 2009

Related U.S. Application Data

(60) Provisional application No. 61/131,219, filed on Jun. 6, 2008.

(51) Int. Cl.
*B01D 11/02* (2006.01)
*B32B 1/02* (2006.01)

(52) U.S. Cl. ............ 137/1; 137/268; 422/264; 422/275; 210/198.1; 210/749

(58) Field of Classification Search .................. 137/268, 137/550, 544, 545, 1; 422/264, 267, 275; 210/198.1, 749, 756, 755, 754, 753, 199; 428/34.1
See application file for complete search history.

(56) References Cited

U.S. PATENT DOCUMENTS

| | | | | |
|---|---|---|---|---|
| 563,921 | A * | 7/1896 | Gridley | 137/268 |
| 4,465,485 | A * | 8/1984 | Kashmer et al. | 604/320 |
| 4,512,955 | A * | 4/1985 | Etani | 137/268 |

* cited by examiner

*Primary Examiner* — Kevin Lee
(74) *Attorney, Agent, or Firm* — Paul Barenie, Esq.

(57) ABSTRACT

A fluid treatment canister that may be used with, or independent of, a fluid treatment system, comprises a treatment housing, a first treatment housing end that is covered, and a second treatment housing end. A barrier support is coupled with the second treatment housing end, and includes a first and second barrier support portions, and is capable of receiving a barrier disposed between the first and second barrier support portions.

24 Claims, 8 Drawing Sheets

FLUID TREATMENT CANISTER AND SYSTEM

CROSS REFERENCE TO RELATED APPLICATIONS

This patent document claims the benefit of the filing date under 35 U.S.C. §119(e) of Provisional U.S. Patent Application Ser. No. 61/131,219, entitled "Fluid Treatment Canister and System" to R. Florkiewicz, that was filed on Jun. 6, 2008, and is hereby incorporated by reference herein.

TECHNICAL FIELD

This disclosure is directed to fluid treatment, and more particularly, to a system for treating fluids.

BACKGROUND ART

There are many applications that require the treatment of fluids such as water. Such applications may include, but are not limited to, commercial and industrial cooling towers (i.e., for cooling industrial machinery, heating/air conditioning systems, refrigeration units, etc. . . . ) closed-loop water circulating systems, hydronic heating water circulating loops, water softening systems, systems that treat water for swimming pools, etc. . . .

In such applications, the fluid treatment may involve adding chemicals or other substances to the fluid, or to neutralize or reduce undesirable chemicals, or substances such as bacteria, from the fluid.

To add chemicals or other substances to the fluid, the fluid is typically circulated through a treatment system. One such treatment system 100 that may used, for example, in treating a commercial or industrial water cooling tower, is shown in the partial exploded view of FIG. 1. As shown in FIG. 1, the treatment system includes a fluid outlet 102, a cylinder 104 that is filled with treatment baskets shown at 106 that hold treatment chemical pellets or powder (not shown), and a fluid inlet 108. Not shown, the treatment baskets are typically enclosed, for example using a treatment basket lid. A lid 110 is placed on a top of the cylinder 104. The treatment baskets 106 are four inch diameter stainless steel or plastic baskets 16 to 32 inches in height, enclosed at the top and bottom, with a hole pattern disposed in the basket sides, the hole pattern allowing water circulated through the treatment system to dissolve the chemical pellets and thereby to distribute the chemical into the water.

Servicing such water treatment systems of FIG. 1 is time-consuming, as it requires service personnel to remove potentially heavy baskets from the top of the system, refill the baskets 106 with new chemicals, and insert the baskets back into the treatment housing 104. Further, the baskets 106 give little control over the rate the chemical pellets are distributed into the water being treated. If it becomes necessary to alter the chemical distribution rate of the fluid/water being treated, the chemical composition and/or coating of the chemical pellets must be changed to achieve the desired distribution rate. Alteration of the chemical composition and/or pellet coating may be a complicated procedure and require custom chemical pellet makeup for a particular application. Further, the conversion of treatment chemicals to a pellet form for use in the baskets may be a complicated and time-consuming process.

This invention is directed to overcoming one or more of the problems discussed above.

DETAILED DESCRIPTION OF THE PREFERRED EMBODIMENT

A fluid treatment canister and system, and a method, are provided. A treatment canister comprises a treatment housing, having a first end that is covered, and a second end. A barrier support is coupled with the second end, and includes a first and second barrier support portions, and is capable of receiving a barrier disposed between the first and second barrier support portions.

In one embodiment, the treatment housing includes a valve for releasing air present in the canister. In a further embodiment, the valve is disposed at the first end. In another embodiment, where one of the first and second barrier support portions includes a recess portion, and the other of the first and second barrier support portions includes a key portion, the recess portion is capable of receiving the key portion. In yet another embodiment, a securing lid portion is provided for covering and securing the first and second barrier support portions to the second end.

In another embodiment, a spacer portion coupled at the second end. In a further embodiment, one of the first barrier portion and the second barrier portion includes the spacer portion.

In another embodiment, the first barrier support portion is separable from the second barrier support portion. In a further embodiment, the second barrier support portion is disposed within a recess of the first barrier support portion, where a barrier may be sandwiched between the first and second barrier support portions.

In yet another embodiment, the first and second barrier support portions are a single piece, and includes a channel between the first and second barrier support portions, the channel capable of receiving a barrier.

In another embodiment, at least one of the first and second barrier support portions includes a cross member. In a further embodiment, at least one of the first and second barrier support portion includes an annular ring.

In yet another embodiment, a barrier insert is disposed between the first and second barrier support portions, and includes an orifice through which contents of the treatment canister may escape from the treatment canister.

Figure 1:
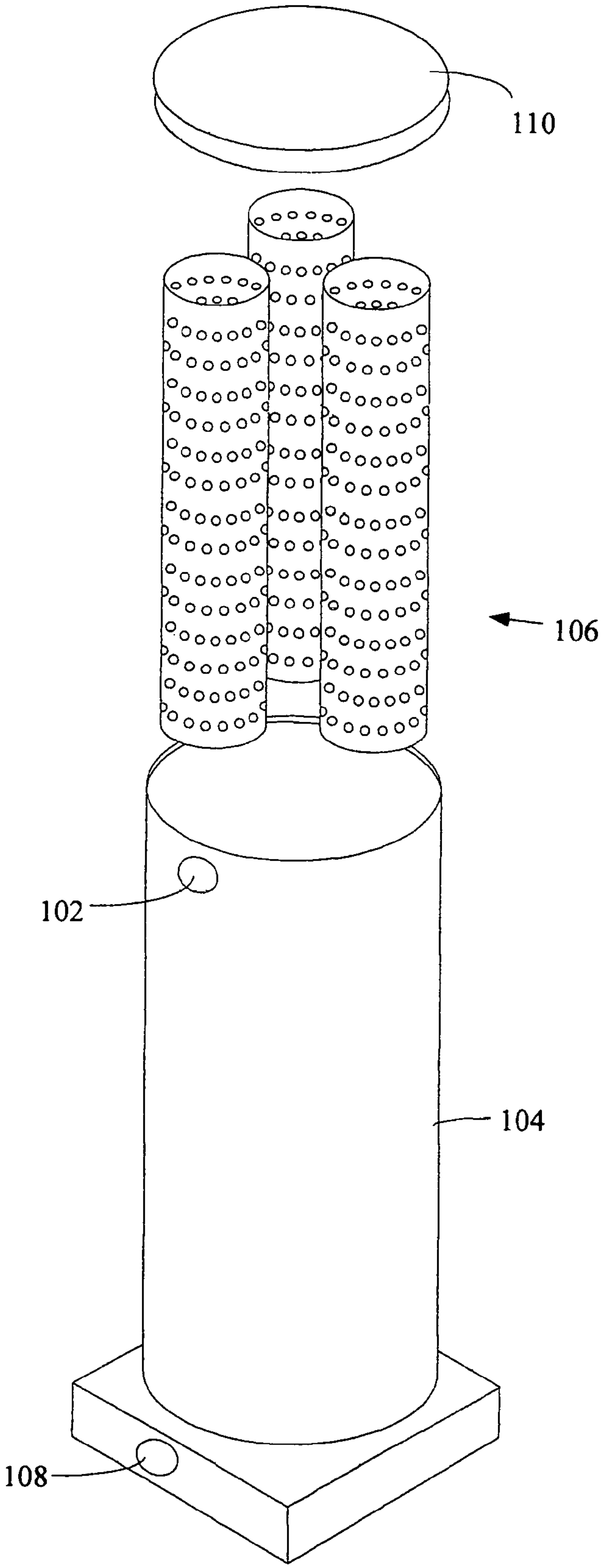
Figure 1 (Prior Art)
FIG. 1 is an exemplary prior art water treatment system.
Figure 2:
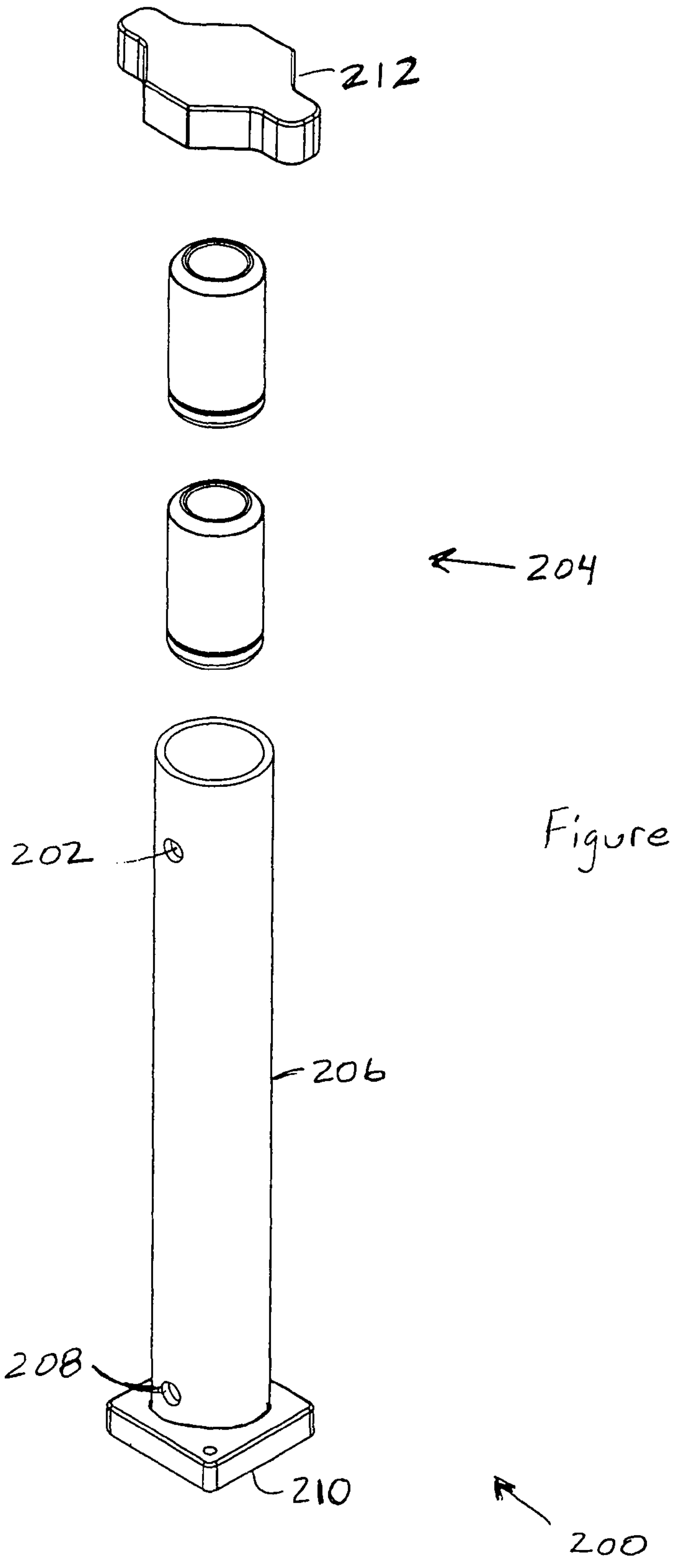
FIG. 2 is a partial-exploded perspective view of a fluid treatment system that may be utilized in accordance with an embodiment of the invention.

A partial-exploded perspective view of a fluid treatment system 200 is shown in FIG. 2, in accordance with an embodiment of the invention. As shown in FIG. 2, the fluid treatment system 200 may include a fluid outlet 202, one or more treatment canisters shown at 204 (here, two treatment canisters are shown), a system housing 206, a fluid inlet 208, a base 210 and a lid 212.

The components of the water treatment system 200 may be any plastic, metallic, or any other material that is capable of withstanding any fluid pressures of the system, any necessary corrosion resistance to the fluids, chemicals and wastes that may be present with in the fluid treatment system, and any temperature requirements of the fluids being treated. For example, the system housing may be any plastic or metallic material such as schedule 80 PVC pipe. The pipe may be any diameter depending on the particular use for which it is employed. For example, for a large (i.e., greater than 50 tons) cooling tower employed for cooling heavy industrial equipment, the pipe may be 12 to 14 inches in diameter, and may be approximately 36 inches high. The PVC pipe is typically opaque (for example, to minimize algae growth in a water-based system), but may be clear, or translucent. The top and bottom of the system housing 206 and the base and lid 210, 212 respectively may be friction-fit (with or without adhesive), or threaded (not shown), such that the system housing may be screwed into the lid and base. The water inlet and water outlets 202 and 208 may be threaded for coupling with fluid tubing, pipes or other fluid delivery means. Other coupling means, for example compression couplings may be utilized.

The base 210 and lid 212 may be formed from any thermoplastic material, for example, Type 1 dark gray PVC. Other plastic or metallic materials may be employed as chemical compatibility needs dictate. The canister(s) 204 are discussed in detail below.

Although not shown, the upper and/or lower fluid outlets and inlets 202, 208 may instead be located in other locations, for example, the fluid inlet 208 may be located in the base 210. In this circumstance, it will be appreciated by one skilled in the art, that fluid channels may be provided in the base 210, allowing fluid to enter and exit the fluid treatment system 200. It will be additionally appreciated that the fluid treatment system may include other components, for example circulation pumps, valving, storage tanks, tubing/piping, physical filtration portions, etc. . . . , not shown.

The fluid treatment system 200 will be discussed in the context of treatment of water in a water cooling tower for commercial and industrial equipment to provide refrigeration or machine or building cooling, that may be used, for example, for a hospital, office building, or department store. However, it will be appreciated by one skilled in the art, that such system and canister(s) 204 may be used to treat any fluid media, for example but not limited to, water, municipal and industrial waste water, and ethylene glycol, that may be utilized in treating fluids in cooling systems, swimming pools, water softeners, drainage or other effluent systems. Such treatment may include, for example, corrosion prevention, ph alteration, removal of minerals, and removal or killing of bacteria, fungus and/or algae from fluids.

Figure 3A:
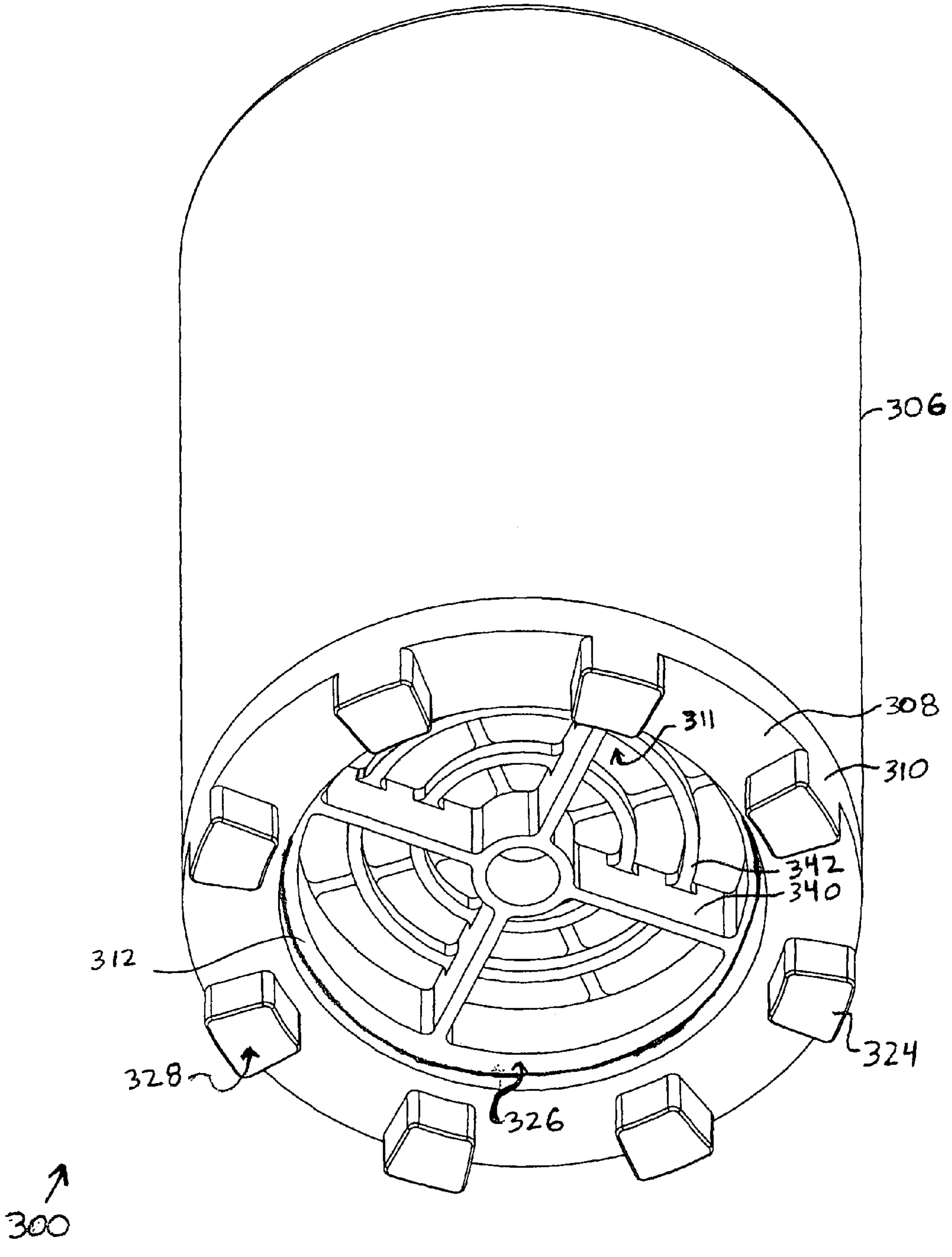
FIG. 3A is a perspective view of a treatment canister that may be utilized in accordance with an embodiment of the invention.
Figure 3B:
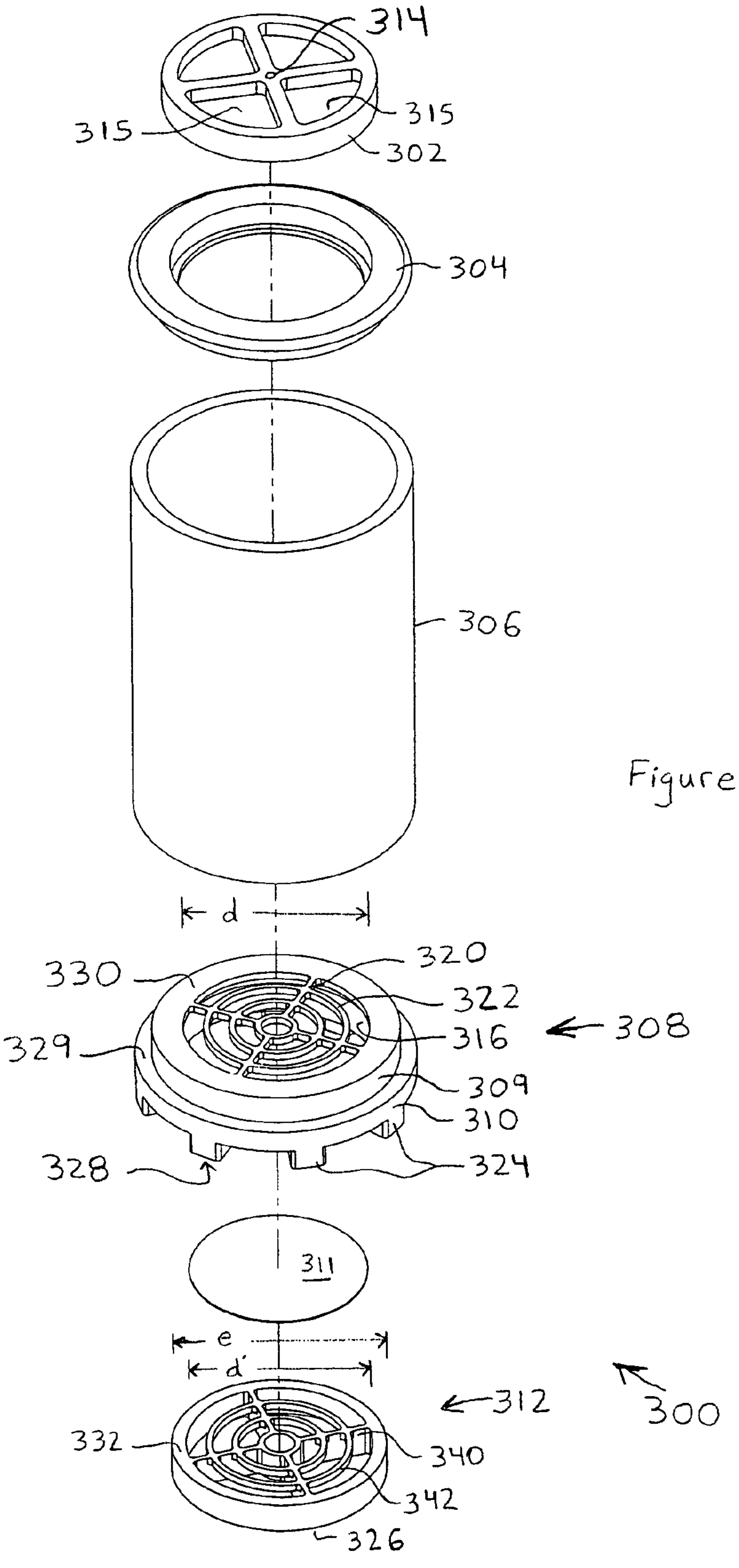
FIG. 3B is an exploded perspective view of the treatment canister of FIG. 3A, that may be utilized in accordance with an embodiment of the invention.

FIG. 3A is a perspective view of a treatment canister 300 that may be utilized in accordance with an embodiment of the invention. FIG. 3B is an exploded perspective view of the treatment canister of FIG. 3A that may be utilized in accordance with an embodiment of the invention. The treatment canister 300 may, for example, be the canister(s) 204 that is used in conjunction with the fluid treatment system 200 of FIG. 2.

As shown in FIGS. 3A and/or 3B, the treatment canister 300 may include a first treatment housing lid portion 302, a second treatment housing lid portion 304, a treatment housing 306, and a barrier support portion comprising a first barrier support 308 and a second barrier support 312. The first treatment housing portion may include a valve, for example, a "duck bill" style check valve 314 having a diameter of approximately ⅛ inch, formed from an EPDM, Silicone, or other flexible rubber-like material, that is manufactured by Vernay, as Part no. VL857-101. Such valve may allow the escape of air from the treatment canister 300 when the canister is utilized in the treatment of a fluid, thereby preventing air from being locked in the treatment canister, and assisting in the dissolving of the chemical agent (or other substance) present in the canister. Other valves may be employed. A barrier 311 (i.e., a diffusion or osmosis controlling barrier) may be provided with the treatment canister.

The first and second treatment housing lid portions 302 and 304 cover a first end of the treatment housing 306. The first treatment housing lid portion 302 is a solid piece plug that may be screwed into second treatment housing lid portion 304. The first treatment housing lid portion 302 and second treatment housing lid portion 304 may then be fit into the top of the treatment housing 306 by friction fit (with or without an adhesive), or in the alternative (not shown), the second treatment housing lid portion 304 and top of the treatment housing 306 may be threaded, allowing the second treatment housing lid portion 304 to be threaded onto the housing 306. The "duck bill" style valve 314 may be disposed into a hole bored through the first treatment housing lid portion 302. Although shown in the center of the first treatment housing lid portion 302, placement of the "duck bill" style valve may be anywhere in the first treatment housing lid portion 302. In the alternative, the valve 314 may instead be located anywhere on the treatment housing, for example, anywhere along the sides of the treatment canister 306. Further, in an alternative embodiment not shown, the first treatment housing lid portion 302 and second treatment housing lid portion 304 may be a single piece. As shown, the first treatment housing lid portion 302 may include one or more recessed portions 315 providing a ridge between the recessed portions that may be utilized as a handle for use in inserting and removing the treatment canister in/out of the water treatment system.

The first barrier support 308 may be inserted via friction fit into the treatment housing 306 (with or without an adhesive), or not shown, the treatment housing and first barrier support may be threaded, allowing the first barrier support to be screwed into the treatment housing. An inside edge of the treatment housing 306 may seat (or screw) against a first outer edge 309 of the first barrier support 308. An outer edge of the treatment housing may be flush with a second outer edge 310 of the first barrier support 308.

A barrier 311 (i.e., a diffusion and/or osmosis controlling membrane) may be placed in the first barrier support 308, and secured by the second barrier support 312. The second barrier support 312 may be secured in the first barrier support 308 by friction fit, or not shown, the second barrier support and an inner mating edge 316 of the first barrier support 308 may be threaded, allowing the second barrier support to be screwed into the first barrier support. A seal may be created between the underside of the first barrier support 308, for example an underside of a surface 330 of the first barrier support, the barrier 311, and an upper surface 332 of the second barrier support 312, to help prevent the substance/chemical from exiting the treatment canister except through the barrier 311.

The first barrier support 308 may include a plurality of cross members 320 and annular rings 322, that may be used to provide support to the barrier 311, and may thereby reduce the chance that the barrier 311 may collapse or otherwise fold to the inside or outside of the treatment canister that thereby may allow the substance/chemical to exit the treatment canister other than through the barrier 311. It will be appreciated that more or less cross members 320 and annular members 322 may be utilized. It will be realized that in some circumstances, more or less cross members 320 may be sufficient, and no annular members 322 may be necessary.

The first barrier support 308 may further include one or more spacer blocks, here shown as a plurality of spacer blocks 324, that provide spacing between multiple treatment canisters 300 that may be stacked within a fluid treatment system such as the treatment system 200, or between a treatment canister and base 210 of the fluid treatment system. The spacer block(s) 324 provide sufficient spacing between stacked treatment canisters to allow the fluid to enter and exit the treatment canister through the first barrier support 308 and second barrier support 312. It will be appreciated that when the second barrier support is inserted into the first barrier support 308, a second barrier support bottom 326 does not extend into a plane 328 formed by the bottom of the spacer block(s) 324, thereby allowing fluid to enter and exit the treatment canister 300. In one embodiment, the second barrier support bottom 326 does not breach a plane formed at a first barrier support portion 329.

Similarly, as shown at the second barrier support 312, a plurality of cross members 340 and annular rings 342 may be used to provide support to the barrier 311, and may thereby reduce the chance that the barrier 311 could collapse or otherwise fold to the inside or outside of the treatment canister that thereby may allow the substance/chemical to substantially exit the treatment canister other than through the barrier 311. As with the first barrier support 308, it will be appreciated that more or less cross members 340 and annular members 342 may be utilized at the second barrier support 312. It will be realized that in some circumstances, more or less cross members 340 may be sufficient, and no annular members 342 may be necessary at the second barrier support. It will further be realized that the cross-member and/or annular ring configuration of the first barrier support 308 need not match the cross member and/or annular ring configuration of the second barrier support 312.

The barrier 311 may be any barrier capable of restricting the exit of, or containing, a substance, chemical or other material and/or any substance or chemical solution within the treatment canister, and or controlling release of the same from the canister. For example, the barrier 311 may be a diffusion or osmosis barrier, such as any paper or polymer membrane, for example, a Grade 50 Quantitative Filter Paper manufactured by Whatman, and/or a GE Model #T99CP04700 Flat Sheet Polyester Membrane with 10 micron openings, selected for its porosity (i.e., sized molecule and/or substance). Further, or in the alternative, the barrier 311 may be a mesh screen, for example, a standard White Nylon woven thermoplastic mesh with 30.2×30.2 mesh size and a 600 Micron rating. It will be appreciated that the barrier may be any paper or polymer membrane, selected for its porosity in allowing a particular diffusion and/or osmosis rate of a fluid and chemical composition/solution within the treatment canister to pass through the membrane to treat the fluid for the fluid treatment system in which the treatment canister is utilized. In some embodiments, where the treatment chemical is of such low solubility, an unspecialized mesh barrier, mesh screen, cheese cloth, or other generic barrier may be employed in addition to, or instead of, a diffusion and/or osmosis barrier, to contain the bulk chemical or material within the treatment canister. The composition of the barrier 311 may, but need not, be used to determine a number of cross-members 320, 340 and/or annular rings 322, 342. For example, a barrier 311 may be of sufficient stiffness, or include an internal support, allowing less cross members and/or annular rings to be used. A barrier 311 with less stiffness may require a greater number of cross members and/or annular rings.

The selection of the material for the barrier 311 may allow a controlling of delivery of the powdered and/or pellet-form of a chemical or other substance used to treat the fluid. A barrier 311 may be selected from a vast selection of diffusion and/or osmosis barriers, membranes or other materials, accounting for the particular treatment application. The second barrier support 312, via friction, screw or other fit, may be inserted into the first barrier support 308 to different degrees, to accommodate a vast array of thicknesses of barriers 311. Changing the barrier 311 may allow the delivery of the powdered and/or pellet form chemical/substance to be altered, for example, to tweak the delivery to a more desired or accurate delivery level for the particular fluid treatment application, or may allow the treatment canister to be used with a completely different chemical/substance for treating the fluid without the necessity of redesigning the treatment canister.

In addition or in the alternative, a surface area of an opening of the first barrier support 308 and/or the second barrier support 312 may be altered to control delivery of the treatment chemical/substance in the treatment canister 300. For example, a surface area in a first barrier support surface 330, and/or in a second barrier support surface 332, may be altered to help control dispensing of the chemical/substance of the treatment canister 300 for treatment of the fluid. For example, by reducing or increasing the surface area of the first barrier support surface 330 and/or the second barrier support surface 332, the amount of treatment chemical/substance delivered for treatment may be reduced or increased respectively. The surface area may be altered, for example, by increasing the width of the cross members and/or annular rings 320, 322 and/or 340, 342 of the first barrier support 308 and second barrier support 312 respectively. In addition or in the alternative, the surface area may be altered by reducing or increasing a diameter d or d' of the first barrier support 308 and the second barrier support 312, respectively, where d may, but need not be, equal to d'. In addition or in the alternative, a barrier support insert (discussed with respect to FIGS. 3C and 3D below), may be used to alter the surface area of the first barrier support surface 330 and/or the second barrier support surface 332.

Figure 3C:
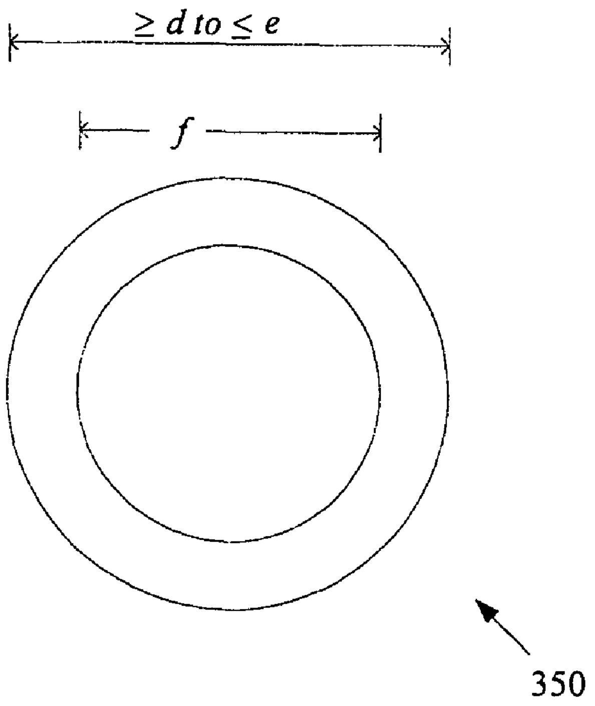
FIGS. 3C and 3D are top views of exemplary barrier inserts that may be utilized in various embodiments of the invention.

FIG. 3C illustrates a top view of an exemplary barrier insert 350 that may be utilized in accordance with an embodiment of the invention. As shown in FIG. 3C, a barrier insert 350 may have an outer diameter of greater than or equal to d and less than or equal to e of FIG. 3A. An inner diameter f would be selected to provide the desired surface area of barrier 311 exposure for transferring the treatment chemical/substance to the fluid being treated.

Figure 3D:
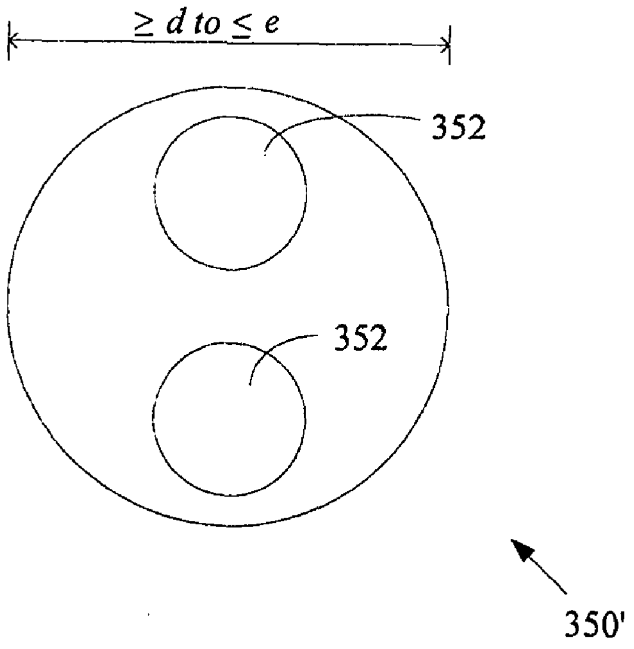

FIG. 3D illustrates a top view of an exemplary barrier insert 350' that may be utilized in accordance with an embodiment of the invention. As shown in FIG. 3D, a barrier insert 350 may have an outer diameter of greater than d and less than e of FIG. 3A, and may include one or more barrier insert cutouts (here shown as two barrier insert cut-outs 352), where the surface area of the cutouts may be selected to provide the desired surface area of barrier 311 exposure for transferring the treatment chemical/substance to the fluid being treated. The number, shape and placement of the cutouts is not crucial, and allows alteration of the surface area.

The barrier inserts 350, 350' may be formed from any material that is resistant to any corrosive properties of the fluids being treated, and the chemical/substance treatments, is appropriate for the temperature of the fluid being treated, and typically does not allow passage of the treatment chemical/substance, and for example, may be formed from plastic. Further, the thickness of the barrier inserts 350, 350' is not important as long as, when the second barrier support is inserted into the first barrier support 308 with the barrier 311, it does not cause a distance between the second barrier support bottom 326 and the plane 328 formed by the bottom of the spacer block(s) 324 to be too small to prevent a desired flow-rate of fluid to the treatment canister 300.

Returning to FIGS. 3A and/or 3B, the materials of the treatment canister may be formed from any plastic, metallic, or any other material that is capable of withstanding any fluid pressures of the system, any necessary corrosion resistance to the fluids, chemicals and wastes that may be present with in the fluid treatment system, and the temperature of fluids being treated by the fluid treatment system in which the canister is employed. The first treatment housing lid portion 302 and second treatment housing lid portion 304 may be formed, for example, from a machineable thermoplastic. The treatment housing 306 may be formed from, for example, PVC pipe, that may be clear, translucent or opaque. The first barrier support 308 and second barrier support 312 may be formed, for example, from machineable thermoplastic. The barrier 311 may be selected as any material providing the properties to contain or distribute the chemical/substance/material in the canister. For example, the barrier 311 selection may account for a desired diffusion and/or osmosis rate of a fluid and chemical solution within the treatment canister to pass through the membrane to treat the fluid for the fluid treatment system in which the treatment canister is utilized. Such selection of the barrier 311 may account for the pressure/volume of the fluid passing by the membrane opening in the treatment canister.

Exemplary dimensions for use of the treatment canister 300 with the fluid treatment system of FIG. 200 will now be discussed. The system housing 206 may be approximately 4 inches in diameter where the treatment canister 206 may have a diameter of 3.75 inches or less, for example, to allow appropriate fluid flow rates, and may be approximately 4.5 inches or less in diameter where the system housing 206 has a diameter of 5 inches. The treatment housing may have an exemplary height of 6-24 inches, and a wall thickness of approximately 0.25 inches. The dimension of the hole in which the "duck bill" style valve 314 is inserted is approximately 0.119 inches, where the approximate outer diameter of the "duck bill" style valve 314 is ⅛ inch.

The first barrier support 308 may have an opening diameter d of approximately 3 inches, where the width of the cross members 320 and annular rings 322 are approximately 0.095 inches. The first, second and third annular rings 322 may each have an approximate radius of 0.34, 0.76 and 1.18 inches, respectively. The second barrier support 312 may have an opening diameter d' of approximately 3 inches, where the width of the cross members 340 and annular rings 342 are approximately 0.095 inches. The first, second and third annular rings 342 may have approximate radiuses of 0.34, 0.76 and 1.18 inches, respectively. The approximate area of the opening for the first barrier support 308 is approximately 5.4 sq. inches, and the approximate area of the opening for the second barrier support 312 is approximately 5.4 sq. inches.

The spacer block(s) 324 may have an exemplary height and width along the circumference of 0.375 and 0.5 inches, respectively, and an exemplary spacing of approximately 3.55 inches between spacer block(s) 324 centers along the circumference of the first barrier support 308. There may be, for example, 8 spacer blocks 324. The barrier 311 has an outer diameter that is typically as great as the smaller of the opening diameter d of the first barrier support 308 and the opening diameter d' of the second barrier support 312, and typically less than the outer diameter e of the second barrier support 312.

An exemplary use and operation of a fluid treatment system, here the water treatment system 200 of FIG. 2, will be discussed in conjunction with the treatment canister 300, where a diameter of the system housing is 5 inches, and the diameter of the treatment housing 306 is 4.5 inches, and the treatment canister dimensions are the exemplary dimensions discussed above. The operation is discussed in conjunction with the treatment of fluid (here water) from a cooling tower that may be utilized for cooling industrialized machinery, refrigeration units, or heating systems in, for example, a hospital, office building or department store. An exemplary flow rate of fluid through the system may be approximately 1-2 gallons per minute. In this example, two treatment canisters 300 are employed.

The first canister may include a Grade 50 Quantitative Filter Paper manufactured by Whatman may be utilized, allowing molecules/substances up to approximately 2 microns to pass, and a thickness of 0.035 inches. The first canister may include a biocide, for example "BromiCide" granule or powder available from BWA Water Additives. The second canister may utilize a GE Model #T99CP04700 Flat Sheet Polyester Membrane with 10 micron openings, manufactured by GE, and having a thickness of approximately 0.035 inches. The second canister may include a "Towerpro" 8031 All-In-One Water Treatment tablet, manufactured by BWA Water Additives. The "Towerpro" 8031 All-In-One Water Treatment tablet is a proprietary combination of algae and microbiological control agents and organic antiscalant technology for crystal modification and dispersion with an efficient yellow metal corrosion inhibitor. The first and second canister may be stacked within the system housing 206 similar to as shown in FIG. 2, where the treatment canisters are inserted into the fluid treatment system 200 second barrier support 312 end first.

The canisters 300 are placed into the system housing 206, and the lid 212 fixed to the top of the system housing. Water inlet and outlet pipes, hoses or tubes are coupled at the fluid inlet 208 and fluid outlet 202 respectively.

Fluid (here, water) enters the fluid treatment system 200 via fluid inlet 208, and travels through and fills the system housing 206, to the fluid outlet 202. Fluid pressure within the system housing may cause the water from the system housing to enter each canister through the respective barrier 311 into the treatment canisters, with the air from each canister escaping through its respective "duck bill" style valve 314. The water then causes the granular or powder BromiCide chemical of the first treatment canister, and the Towerpro tablet of the second treatment canister to begin to dissolve. The check valve opens as the water level in the canister rises. Once the water level stabilizes, the head pressure combined with the cracking pressure of the valve maintains the seal.

As the concentration of the BromiCide chemical solution of the first canister is greater than that of the water of the treatment housing (i.e., on the outside of the membrane of the first canister), the Quantitative Filter Paper membrane of the first canister allows the solution to exit the first canister into the water of the system housing by the processes of diffusion or osmosis. Similarly, as the concentration of the Towerpro chemical solution of the second canister is greater than that of the water of the treatment housing (i.e., on the outside of the membrane of the second canister), the GE #T99CP04700 membrane of the second canister allows the solution to exit the second canister into the water of the system housing by the process of diffusion/osmosis.

The spacer blocks 324 provide adequate openings between the stacked canisters, and between the bottom canister and the base 210, to allow sufficient water flow contact with the respective first and second canister membranes, to allow the transfer of the treatment chemicals/substances from the respective treatment canister to the water in the system housing 206.

At a predetermined time interval such as once a month (and in other circumstances, may depend on release rate of the chemical/substance from the canister), or upon inspection of one or all canisters for chemical depletion, it may be determined that the chemicals of one or all canisters need to be replenished. This may be accomplished, for example, by shutting off the water inlet 208 using a valve (not shown), and removal of the lid 212. One or all of the first and second canisters may be removed from the system housing 206. The first treatment housing lid portion 302 may be removed, any chemical or chemical pellet coating residue removed from the treatment canister, and the canister refilled with the appropriate chemical. The treatment canister may then be inverted and the barrier 311 (i.e., here the diffusion or osmosis membrane) may be inspected. If it is determined that the barrier 311 needs replacement, the second barrier support 312 may be removed, the barrier replaced, and the second barrier support 312 reinserted.

It will be appreciated that such canister servicing may be accomplished in the field, or at some other location. The canisters may be disposable in nature, with prepackaged replacement canisters with the appropriate treatment chemical/substance used in servicing the water treatment system.

In some circumstances, some fluid treatments may need to occur only a certain time frame per month. For example, it may be determined that a fungicide chemical treatment may need to be used as a fluid treatment for approximately two weeks of a month time period, and similarly, an algaecide chemical treatment may need to be used as a fluid treatment for approximately two weeks of a month time period. In this circumstance, the same treatment canister may be utilized for both treatments during the month time frame. For example, the fungicide treatment may be placed into a canister, selecting an appropriate barrier 311 (i.e., here, a diffusion and/or osmosis membrane) for the fungicide (or in the alternative, altering the opening of the first barrier support 308 and/or second barrier support 312, or inserting an appropriately sized barrier insert 350/350'), and utilizing that configuration for the first half of the month. Then, the algaecide treatment may be placed into a canister, selecting an appropriate barrier 311 (i.e., here a diffusion/osmosis membrane) for the algaecide (or in the alternative, altering the opening of the first barrier support 308 and/or second barrier support 312, or inserting an appropriately sized barrier insert 350/350'), and utilizing that configuration for the second half of the month.

In this way, the same canister may be utilized alone or with other treatment canisters in a fluid treatment system to provide treatments using different chemicals/substances.

Although this example has been discussed in the context of different chemicals being used in different canisters, for example, to tailor a particular chemical cocktail/recipe for treating the water in a particular environment (here, the water cooling tower), it will be appreciated that the multiple canisters may instead all contain the same chemical, or any combination of compatible chemicals.

Figure 4A:
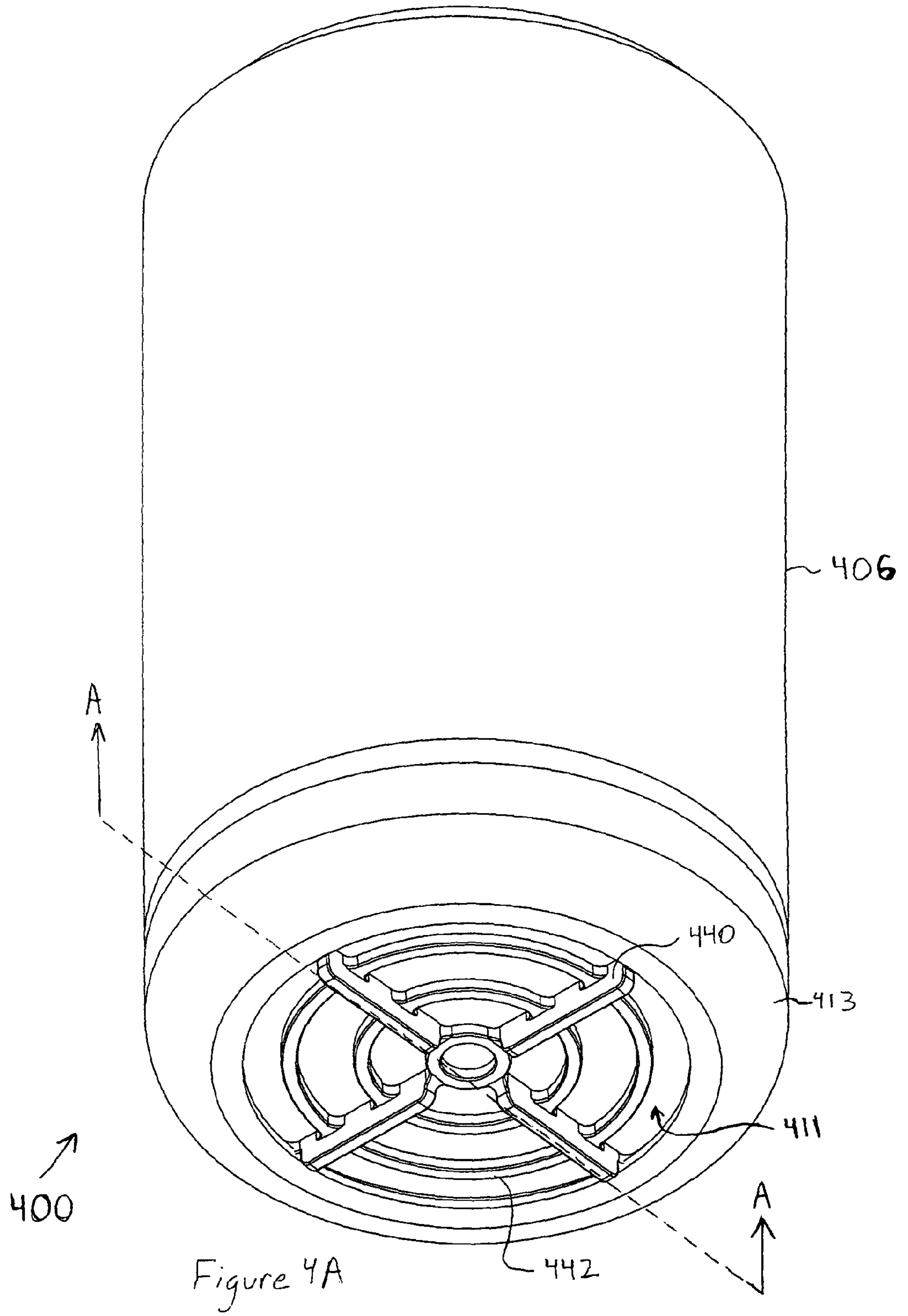
FIG. 4A is a perspective view of a treatment canister that may be utilized in accordance with an embodiment of the invention.
Figure 4B:
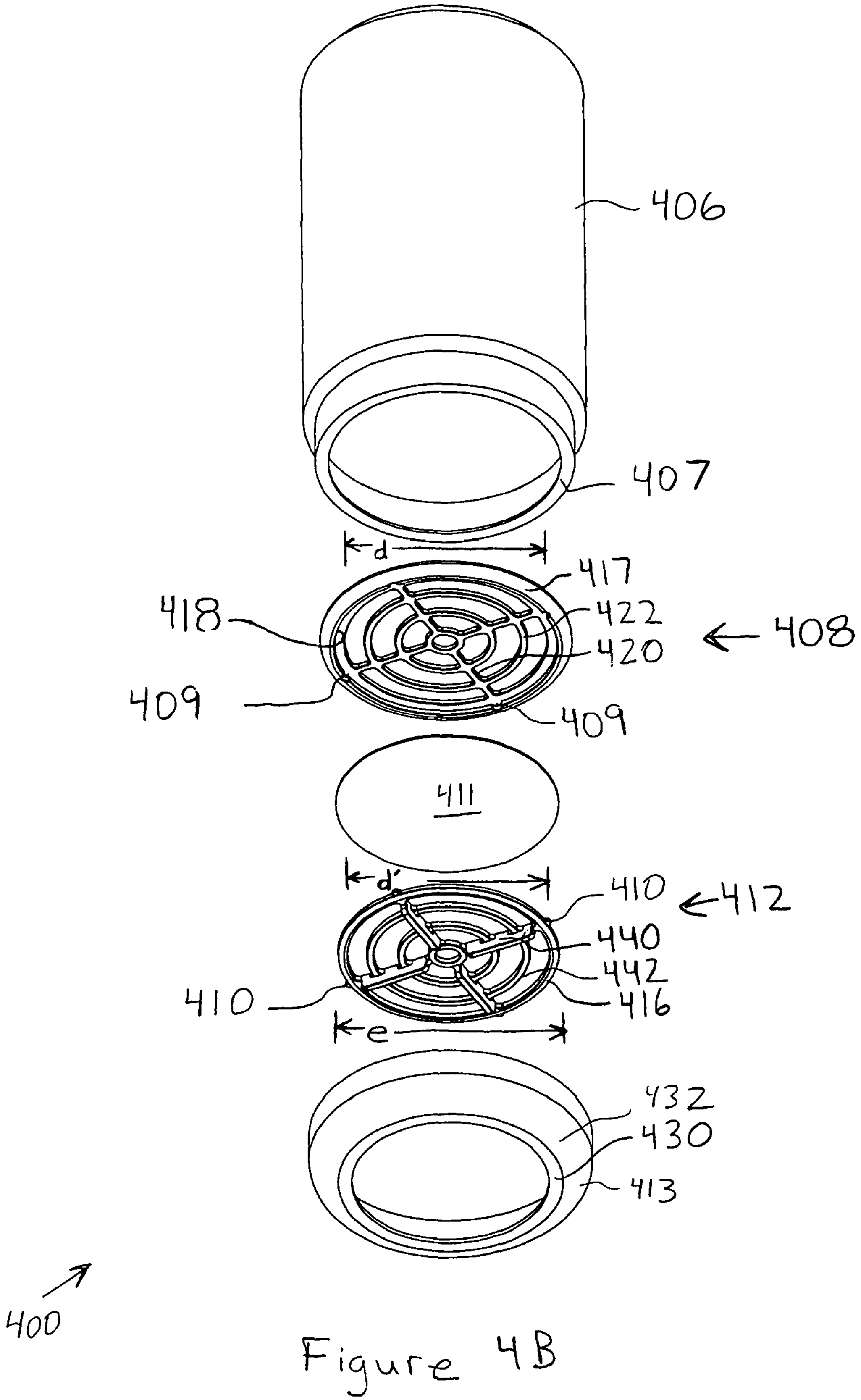
FIG. 4B is an exploded perspective view of the treatment canister of FIG. 4A, that may be utilized in accordance with an embodiment of the invention.

FIG. 4A is a perspective view of a treatment canister 400 that may be utilized in accordance with an embodiment of the invention. FIG. 4B is an exploded perspective view of the treatment canister of FIG. 4A that may be utilized in accordance with an embodiment of the invention. The treatment canister 400 may, for example, be the canister(s) 204 that is used in conjunction with the fluid treatment system 200 of FIG. 2.

As shown in FIGS. 4A and 4B, the treatment canister 400 may include a treatment housing 406, a barrier support portion comprising a first barrier support 408 and a second barrier support 412, and a securing lid 413. An end of the treatment housing 406 opposite the first barrier support 408 may include a valve, for example, an umbrella valve (not shown), for example, that is manufactured by Vernay as an umbrella check valve, part # VL 186-185. The umbrella check valve may, for example, be formed from a fluorosilicone material with a cracking pressure sufficient for the particular application. Such valves, as will be appreciated by one skilled in the art, may be seated in a hole bored through the end of the treatment housing (not shown), and include at least one hole beneath the ‘umbrella’ portion of the valve (not shown), to allow the escape of air from the treatment housing 406. One embodiment may employ three holes, approximately 0.089 inches in diameter, beneath the umbrella portion. Other valves allowing the escape of air from the treatment canister 400 when the canister is utilized in the treatment of a fluid, thereby preventing air from being locked in the treatment canister, may be employed. The treatment canister 400 may further include a barrier 411, (i.e., a diffusion or osmosis controlling barrier).

The valve may be placed anywhere in the end of the treatment housing opposite the first barrier support 408, or may be placed anywhere else on the treatment housing 406, for example, along a side wall of the treatment housing 406. In an additional embodiment not shown, one or more of the canisters 400 may be placed into a mesh sleeve (i.e., the mesh having sufficient opening size and numbers to allow a sufficient flow of fluid through the mesh to the canisters 400, for example an extruded mesh netting having a capacity of 9-11 inches. For example, the netting may be a “Meshred” netting from US Netting, where the mesh sleeve may be closed at one end, and bound at the opposite end, and allow for easy removal of the canister(s) from a fluid treatment system such as the fluid treatment system 200.

The first barrier support 408 may rest adjacent to a treatment housing edge 407. In an alternate embodiment not shown, the treatment housing edge 407 and first barrier support 408 may be threaded for screwing together.

A barrier 411 (i.e., a diffusion or osmosis controlling membrane) may be placed in a recess of the first barrier support 408, and secured by the second barrier support 412. The second barrier support may be secured in the first barrier support 408 by friction fit, or not shown, the first barrier support 408 and second barrier support 412 may be threaded, allowing the second barrier support 412 to be threaded onto the first barrier support 408. As shown, the first barrier support 408 may include first barrier support recesses 409, for receiving corresponding second barrier support keys 410. The first barrier support recesses 409 and second barrier support keys 410 may be provided to prevent spinning of the second barrier support in the first barrier support 408, that may rip or otherwise damage the barrier 411. More or less recesses 409 and tabs 410 may be utilized. A number of tabs 410 need not equal the number of recesses 409.

Figure 4C:
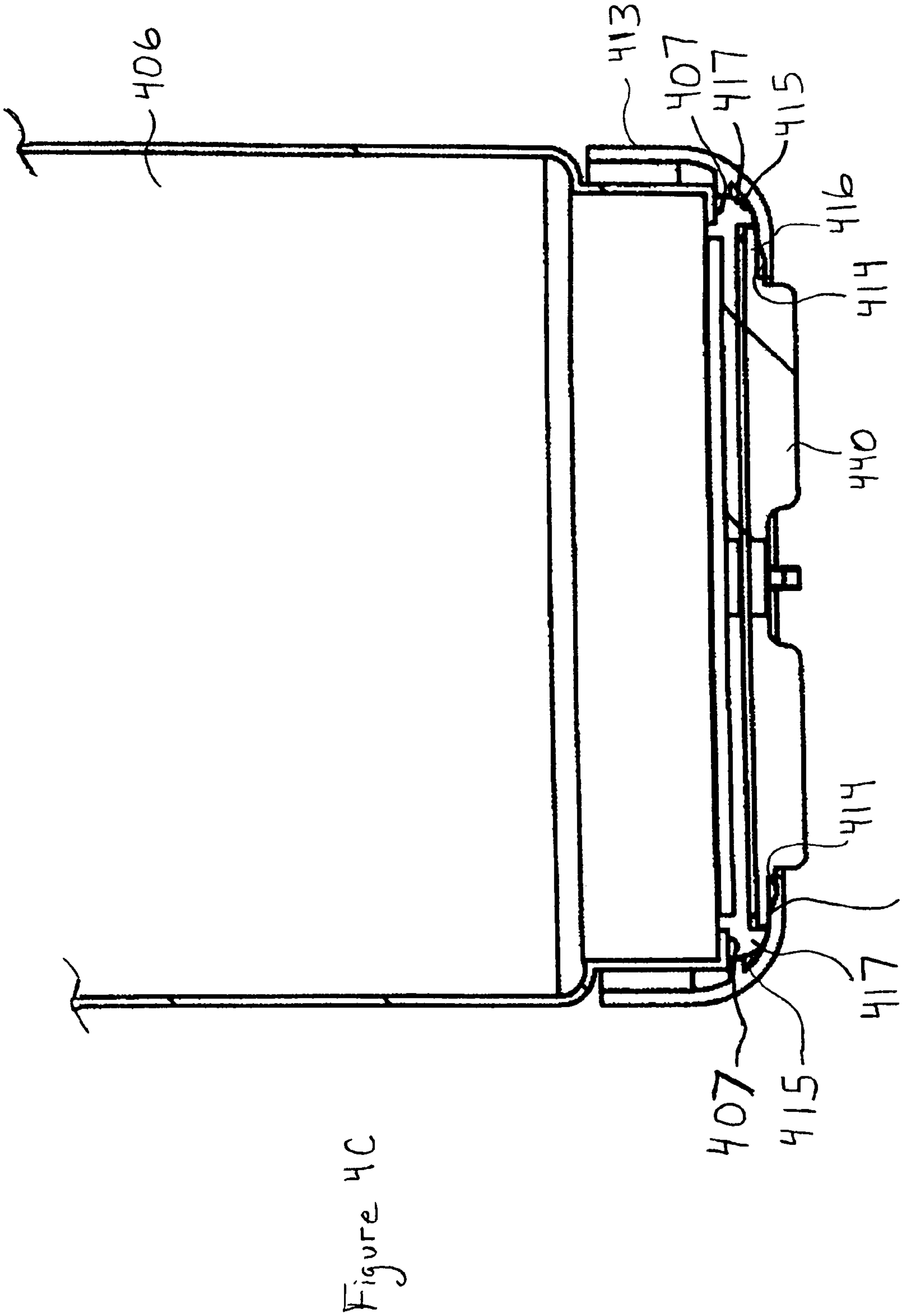
FIG. 4C is a partial sectional view of the treatment canister of FIG. 4A, along the lines A-A, in accordance with an embodiment of the invention.

FIG. 4C is a partial sectional view of the canister 400 of FIG. 4A, along a line A-A, in accordance with an embodiment of the invention. As shown in FIGS. 4A-4C, the securing lid 413 may screw onto the treatment housing 406 via threads (not shown), or by friction fit (with or without adhesive), with an inner surface of lid portions 414 and 415 creating a seal between the securing lid 413, a second barrier support outer edge 416, a first barrier support outer edge 417 and the treatment housing edge 407. In this way, the seal may prevent the substance/chemical of the treatment canister 400 from exiting the treatment canister except through the barrier 411.

Similar to as discussed above with respect to the first barrier support 308 and second barrier support 312, the first barrier support 408 and second barrier support 412 may include a plurality of cross members 420, 440 and 422, 442 respectively. Similar to as discussed above, the cross members and/or annular rings may thereby reduce the chance that the barrier 411 could collapse or otherwise fold to the inside or outside of the treatment canister 400 that thereby may allow the substance/chemical to substantially exit the treatment canister other than through the barrier 411. It will be appreciated that more or less cross members 420, 440 and annular members 422, 442 may be utilized. It will be realized that in some circumstances, more or less cross members 420, 442 may be sufficient, and no annular members 422, 442 may be necessary. Further, the cross member and annular ring configuration of the first barrier support 408 need not match that of the second barrier support 412.

As shown in FIGS. 4A and 4B, the cross members 440 of the second barrier support 412 extend beyond a plane created by the first lid portion 414 surface, thereby serving to act as a spacer portion between stacked treatment canisters, and/or between the treatment canister and a base (i.e., the base 210) of a fluid treatment system. The cross members are of sufficient dimensions to allow the fluid to enter and exit the treatment canister through the lid 413, second barrier support 412, barrier 411 and first barrier support 408.

The barrier 411 may be similar or the same as discussed above with respect to the barrier 311, with similar considerations for selection a particular barrier, and will not be discussed in detail. Thus the barrier 411 may be any barrier capable of restricting the exit of, or containing, a substance, chemical or other material and/or any substance or chemical solution within the treatment canister, and or controlling release of the same from the canister. For example, the barrier 411 may be a diffusion or osmosis barrier, such as any paper or polymer membrane, for example, a Grade 50 Quantitative Filter Paper manufactured by Whatman, selected for its porosity (i.e., sized molecule and/or substance) or mesh screen, such as any paper or polymer membrane, selected for its porosity in allowing a particular diffusion and/or osmosis rate of a fluid and chemical composition/solution within the treatment canister to pass through the membrane to treat the fluid for the fluid treatment system in which the treatment canister is utilized. In some embodiments, where the treatment chemical is of such low solubility, an unspecialized mesh barrier, mesh screen, cheese cloth, or other generic barrier may be employed in addition to, or instead of, a diffusion and/or osmosis barrier, to contain the bulk chemical or material within the treatment canister. The composition of the barrier 411 may, but need not, be used to determine a number of cross-members 420, 440 and/or annular rings 422, 442. For example, a barrier 411 may be of sufficient stiffness, or include an internal support, allowing less cross members and/or annular rings to be used. A barrier 411 with less stiffness may require a greater number of cross members and/or annular rings.

The depth of an insert 418 of the first barrier support 408 may be determined accounting for thickness of the barrier 411 to be utilized, or a maximum conceivable thickness of a barrier 411 that may be desired. It will be appreciated that the securing lid 413 may be formed from a pliable material, allowing one or both of the first and second lid portions 430, 432 to flex where the thickness of the barrier 411 and second barrier support 412 exceeds a depth of the first barrier support recess 418. Thus, similar to as discussed above, a vast selection of barriers having differing thicknesses may be employed with the treatment canister 400 to allow, for example, the delivery of the powdered and/or pellet form chemical/substance to be altered. Such alteration may be, for example, to tweak the delivery to a more accurate chemical treatment level for the particular fluid treatment application, or may allow the treatment canister to be used with a completely different chemical/substance for treating the fluid without the necessity of redesigning the treatment canister. It will be appreciated that in a further or alternate embodiment not shown, the insert 418 may instead, or in addition, be located in the second barrier portion 412.

Returning to FIGS. 4A and/or 4B, and similar to as discussed above with respect to FIGS. 3A-3B, a surface area of an opening of the first barrier support 408 and/or second barrier support 412 may be altered to control delivery of the treatment chemical/substance in the treatment canister 400. Such alterations will not be discussed in detail. As discussed above with respect to the first barrier support 308 and second barrier support 312, surface areas of one or both of the first barrier support 408 and second barrier supports 412 may be altered by altering sizing of the cross members 420, 440, the annular rings 422, 442, by altering a diameter of the opening in the first barrier support 408 and/or the second barrier support 412, and/or by utilizing an insert such as the inserts 350 or 350' discussed above. Such surface area alteration allows alteration of the amount of treatment chemical/substance delivered for treatment.

The components of the treatment canister 400 may be formed from any plastic, metallic, or any other material that is capable of withstanding any fluid pressures of the system, any necessary corrosion resistance to the fluids, chemicals and wastes that may be present with in the fluid treatment system, and the temperature of fluids being treated by the fluid treatment system in which the canister is employed. The treatment housing 406 may be formed from any blow-molded resin, for example, a low or high density polypropylene. The first barrier support 408 and second barrier support 412 may be formed from, for example, low or high density polypropylene. The securing lid 413 may be formed from a high density polypropylene material. As discussed above, the barrier 411 may be selected as any material providing the properties to contain or distribute the chemical/substance/material in the canister. For example, the barrier 411 selection may account for a desired diffusion and/or osmosis rate of a fluid and chemical solution within the treatment canister to pass through the membrane to treat the fluid for the fluid treatment system in which the treatment canister is utilized. Such selection of the barrier 411 may account for the pressure/volume of the fluid passing by the membrane opining in the treatment canister.

Exemplary dimensions for use of the treatment canister 400 with the fluid treatment system of FIG. 200 will now be discussed. The treatment housing may be approximately 3.75 inches diameter where the feeder canister 206 has a diameter of 4 inches. The treatment housing may have an exemplary height of 6-24 inches, but may be any height dictated by the application, and a wall thickness of approximately 0.030 inches along the straight portion of the treatment housing 406. The dimension of the hole in which the umbrella valve may be approximately 0.4 inches in diameter, with a height of approximately 0.143 inches, and a substantial diameter of the umbrella stem being approximately 0.087 inches. The diameter of a hole bored in the treatment housing 406 for receiving the umbrella valve would similarly be approximately 0.087 inches.

The first barrier support 408 may have an opening diameter d of approximately 2.64 inches, where the width of the cross members 420 and annular rings 422 are approximately 0.070 and 0.080 inches, respectively. The first, second and third annular rings 422 may each have an approximate radius of 0.238, 0.643 and 1.048 inches, respectively. The second barrier support 412 may have an opening diameter d' of approximately 2.64 inches, where the width of the cross members 440 and annular rings 442 are approximately 0.070 and 0.080 inches, respectively. The first, second and third annular rings 442 may have approximate radiuses of 0.238, 0.643 and 1.048 inches, respectively. The approximate area of the opening for the first barrier support 408 is 6.87 sq. inches, and the approximate area of the opening for the second barrier support 412 is approximately 6.87 sq. inches.

The cross members 440 may have an exemplary height allowing it to extending approximately 1/16 inch above an outer surface of the securing lid 413. The barrier 411 has an outer diameter that is typically as great as the larger of the opening diameter d of the first barrier support 408 and the opening diameter d' of the second barrier support 412, and typically less than the outer diameter e of the second barrier support 412.

An exemplary use and operation of a fluid treatment system, here the water treatment system 200 of FIG. 2, will be discussed in conjunction with the treatment canister 400, where a diameter of the system housing is 4 inches, and the diameter of the treatment housing 406 is 3.75 inches, and the treatment canister dimensions are the exemplary dimensions discussed above. The operation is discussed in conjunction with the treatment of fluid (here water) from a cooling tower that may be utilized for cooling industrial machinery, refrigeration units and/or heating/air condition systems in, for example, a hospital, office building or department store. An exemplary flow rate of fluids through the water treatment system, may be, for example, 1-2 gallons per minute. In this example, two treatment canisters 400 will be employed.

The first canister may include a Grade 50 Quantitative Filter Paper manufactured by Whatman may be utilized, allowing molecules/substances up to approximately 2 microns to pass, and a thickness of 0.035 inches. The first canister may include a biocide, for example "BromiCide" granule or powder available from BWA Water Additives. The second canister may utilize a GE Model #T99CP04700 Flat Sheet Polyester Membrane with 10 micron openings, manufactured by GE, and having a thickness of approximately 0.035 inches. The second canister may include a "Towerpro" 8031 All-In-One Water Treatment tablet, manufactured by BWA Water Additives. The "Towerpro" 8031 All-In-One Water Treatment tablet is a proprietary combination of algae and microbiological control agents and organic antiscalant technology for crystal modification and dispersion with an efficient yellow metal corrosion inhibitor. The first and second canister may be stacked within the system housing 206 similar to as shown in FIG. 2, where the treatment canisters are inserted into the fluid treatment system 200 securing lid 413 end first.

The canisters 400 are placed into the system housing 206, and the lid 212 fixed to the top of the system housing. Water inlet and outlet pipes, hoses or tubes are coupled at the fluid inlet 208 and fluid outlet 202 respectively.

Fluid (here, water) enters the fluid treatment system 200 via fluid inlet 208, and travels through and fills the system housing 206, to the fluid outlet 202. Fluid pressure within the system housing may cause the water from the system housing to enter each canister through the respective barrier 411 into the treatment canisters, with the air from each canister escaping through its respective umbrella style valve 414 (not shown). The water then causes the granular or powder BromiCide chemical of the first treatment canister, and the Towerpro tablet of the second treatment canister to begin to dissolve. The check valve opens as the water level in the canister rises. Once the water level stabilizes, the head pressure combined with the cracking pressure of the valve maintains the seal.

As the concentration of the BromiCide chemical solution of the first canister is greater than that of the water of the treatment housing (i.e., on the outside of the membrane of the first canister), the Quantitative Filter Paper membrane of the first canister allows the solution to exit the first canister into the water of the system housing by the processes of diffusion or osmosis. Similarly, as the concentration of the Towerpro chemical solution of the second canister is greater than that of the water of the treatment housing (i.e., on the outside of the membrane of the second canister), the GE #T99CP04700 membrane of the second canister allows the solution to exit the second canister into the water of the system housing by the processes of diffusion/osmosis.

The cross members 440 provide adequate openings between the stacked canisters 400, and between the bottom canister and the base 210, to allow sufficient water flow contact with the respective first and second canister membranes, to allow the transfer of the treatment chemicals/substances from the respective treatment canister to the water in the system housing 206.

At a predetermined time interval such as once a month, or upon inspection of one or all canisters for chemical depletion, it may be determined that the chemicals of one or all chemicals need to be replenished. Where the treatment canister is treated as a disposable canister, the water inlet 208 may be shut-off using a valve (not shown), and the lid 212 removed. One or both of the first and second canisters may be removed (i.e. using the mesh sleeve, where they are disposed in a mesh sleeve) from the system housing 206, and disposed of. New (or refilled) treatment canisters 400 with appropriate chemicals may be inserted into the system housing 206, the lid 212 reattached and the fluid flow to the treatment system 200 re-established.

Where the canisters are not treated as disposable canisters, servicing may be accomplished, for example, by shutting off the water inlet 208 using a valve (not shown), and removal of the lid 212. One or all of the first and second canisters may be removed from the system housing 206. The securing lid 413, second barrier support 412, barrier 411 and first barrier support 408 may be removed, any chemical or chemical pellet coating residue removed from the treatment housing 406, and the treatment housing 406 refilled with the appropriate chemical powder/pellet. The barrier 411 (i.e., here the diffusion and/or osmosis membrane) may be inspected. If it is determined that the barrier 411 needs replacement, replacement may be accomplished before reassembling the treatment canister 400.

Similar to as discussed above, with respect to the treatment canister 300, the treatment canister 400 design may be utilized to treat fluids with different chemicals/substances/materials by selecting a different barrier 411, or altering the opening of the first barrier support 408 and/or second barrier support 412, in a fashion as discussed above. Thus, the same canister or canister 400 design may be utilized alone or with other treatment canisters in a fluid treatment system to provide treatments using different chemicals/substances.

Although this example has been discussed in the context of different chemicals being used in different canisters, for example, to tailor a particular chemical cocktail/recipe for treating the water in a particular environment (here, the water cooling tower), it will be appreciated that the multiple canisters may instead all contain the same chemical, or any combination of compatible chemicals.

Although the first barrier support 308 and second barrier support 312, and the first barrier support 408 and second barrier support 412 have been discussed as being two pieces, it will be appreciated that other configurations may be used. For example, the first barrier support 308 and second barrier support 312, or the first barrier support 408 and second barrier support 412, may be a single piece (not shown) with a channel running there-through for receiving the barrier. The barrier may then be circular having a diameter less than the channel width, or may be square with a width less than that of the channel. An insert such as the inserts 350, 350' may additionally be used in the channel to alter the opening. A channel plug may be provided to trap the barrier within the channel.

The water treatment system 200, and canisters 300 and 400, have been discussed as having a circular cross-section. However, it will be appreciated that cross-section shapes, and dimensions, are merely exemplary, and may be altered to serve the particular application. Thus, a fluid treatment system and/or treatment canisters may have a square, rectangular, hexagonal, octagonal, triangular or other cross section while still achieving at least some advantages of the invention. Further, the water treatment system may have a cross section of different shape than the treatment canisters used therewith. Each treatment canister utilized may have the same or a different cross section.

The dimensions discussed above are merely exemplary, and it will be appreciated that other dimensions may be utilized to accommodate the desired environment in which fluid treatment is desired, for example, the fluid flow rate, the particular fluid being treated, and amount of chemical/substance/material desired to add or neutralize in the fluid being treated.

Further, although the canisters 300 and 400 above have been discussed as being used in a fluid treatment system 200, it will be appreciated that such canisters 300 and/or 400 may be utilized in a stand-alone capacity, for example, in an in-line fashion, needing less or no other fluid treatment system components. For example, existing systems or environments may have an existing fluid flow channel with an existing fluid flow rate. Such canisters 300 and/or 400 may be fitted within the existing fluid flow channel. Such existing environments may be, for example, existing piping in a municipal water treatment facility, where canisters may be mounted inside existing municipal water treatment piping. Further, or in the alternative, one or more canisters 300, 400 may be suspended within a vat or tank of fluid/liquid that needs treatment of some fashion, for example any of the treatments or other uses of the canisters 300, 400 discussed herein. It will be appreciated that in some circumstances, the canisters discussed herein need not include the spacer blocks 324, and/or portions of cross member(s) 440 that extend outside an outer surface of the securing lid 413. For example, where the canisters 300, 400 are suspended within a vat or water cooling tank, they may, but need not, include the spacer blocks 324, and/or portions of cross member(s) 440 that extend outside an outer surface of the securing lid 413, as the spacing capabilities provided by these components may not be necessary.

Further, it will be appreciated that although the examples above were discussed in the context of providing chemicals to treat fluids, other substances may be added to the fluid. For example, the canisters 300 and/or 400 may be utilize to add dyes to the fluid, for example, in tracing a source of a particular fluid in the troubleshooting or design considerations of a fluid system.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

I claim:

1. A fluid treatment canister, comprising:
- a treatment housing submersed in the fluid being treated, having
- a first end that is covered, and
- a second end; and
- a barrier support coupled with the second end, including a first and second barrier support portions, and capable of receiving a barrier disposed between the first and second barrier support portions;
- wherein dissolved treatment in the fluid treatment canister leaves the canister through the barrier when the canister is submersed in the fluid being treated.

2. The treatment canister of claim 1, where the treatment housing includes a valve for releasing air present in the canister.

3. The treatment canister of claim 2, where the valve is disposed at the first end.

4. The treatment canister of claim 1, where one of the first and second barrier support portions includes a recess portion, and the other of the first and second barrier support portions includes a key portion, where the recess portion is capable of receiving the key portion to prevent the first barrier support portion from rotating with respect to the second barrier support portion.

5. The treatment canister of claim 1, further comprising a securing lid portion for covering and securing the first and second barrier support portions to the second end.

6. The treatment canister of claim 1, further comprising a spacer where the spacer allows fluid being treated by the canister to enter the canister where fluid treatment canisters are used in a stacked configuration.

7. The treatment canister of claim 6, where one of the first barrier portion and the second barrier portion includes the spacer portion.

8. The treatment canister of claim 1, where the first barrier support portion is separable from the second barrier support portion.

9. The treatment canister of claim 8, where the second barrier support portion is disposed within a recess of the first barrier support portion, a barrier being sandwiched between the first and second barrier support portions.

10. The treatment canister of claim 1, where the first and second barrier support portions are a single piece, and includes a channel between the first and second barrier support portions, the channel capable of receiving a barrier.

11. The treatment canister of claim 1, where at least one of the first and second barrier support portions includes a cross member.

12. The treatment canister of claim 11, where the at least one of the first and second barrier support portion includes an annular ring.

13. The treatment canister of claim 1, further comprising a barrier insert disposed between the first and second barrier support portions, the barrier insert including an orifice through which contents of the treatment canister may escape from the treatment canister.

14. The treatment canister of claim 2, where the valve is a duck bill valve or an umbrella valve for releasing air present in the canister.

15. The treatment canister of claim 1, where the barrier is a membrane barrier selected for its porosity to control passage of the treatment solution across the barrier.

16. A fluid treatment system, comprising:

a system housing having a fluid inlet and fluid outlet;

a base at one end of the system housing;

a lid at an end opposite the base end, of the system housing; where the system housing includes at least one treatment canister submersed in the fluid being treated, comprising:

a treatment housing, having a first treatment housing end that is covered, and a second treatment housing end, and a barrier support coupled with the second treatment housing end, including a first and second barrier support portions, and capable of receiving a barrier disposed between the first and second barrier support portions;

wherein dissolved treatment in the fluid treatment canister leaves the canister through the barrier when the canister is submersed in the fluid being treated.

17. The fluid treatment system of claim 16, where the treatment housing includes a valve for releasing air present in the canister.

18. The fluid treatment system of claim 16, where the second barrier support portion is separable from the first barrier support portion and is disposed within a recess of the first barrier support portion, where a barrier is capable of being sandwiched between the first and second barrier support portions.

19. The fluid treatment system of claim 16, where the first and second barrier support portions are a single piece, and includes a channel between the first and second barrier support portions, the channel capable of receiving a barrier.

20. The fluid treatment system of claim 16, where at least one of the first and second barrier support portions includes a cross member.

21. The fluid treatment system of claim 20, where the at least one of the first and second barrier support portion includes an annular ring.

22. The fluid treatment system of claim 16, further comprising a barrier insert disposed between the first and second barrier support portions, the barrier insert including an orifice through which contents of the treatment canister may escape from the treatment canister.

23. The treatment system of claim 17, where the valve is a duck bill valve or an umbrella valve for releasing air present in the canister.

24. A method for treating a fluid, comprising:

providing a treatment canister submersed in the fluid being treated, the treatment canister capable of holding a chemical for treating the fluid and including a treatment housing having a first end that is covered, and a second end; and providing a barrier support coupled with the second end, and including a first and second barrier support portions and capable of receiving a barrier disposed between the first and second barrier support portions, and capable of allowing any contents of the treatment canister to escape through the barrier;

wherein dissolved chemical in the fluid treatment canister leaves the canister through the barrier when the canister is submersed in the fluid being treated.

* * * * *